Aug. 29, 1933.   J. C. WOODCOCK ET AL   1,924,144
INDICATOR FOR DISTRIBUTING APPARATUS
Filed Feb. 15, 1932
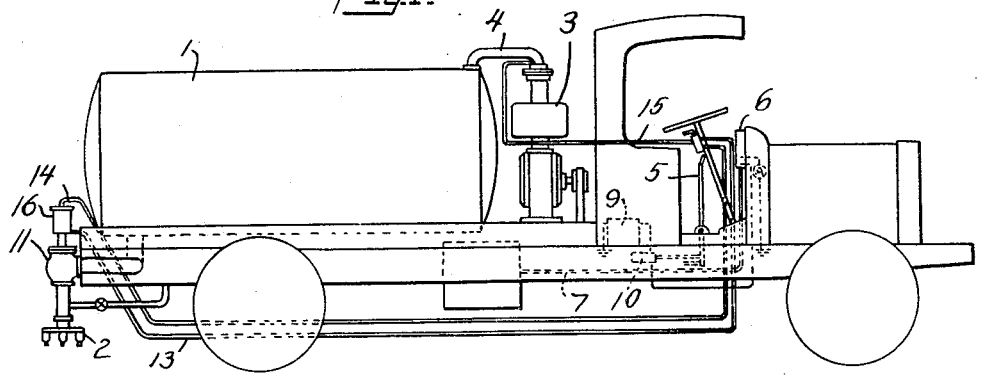
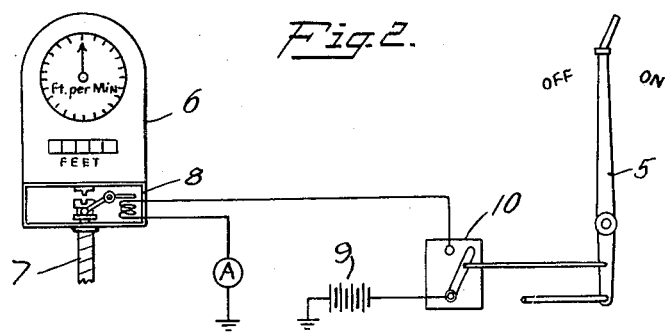
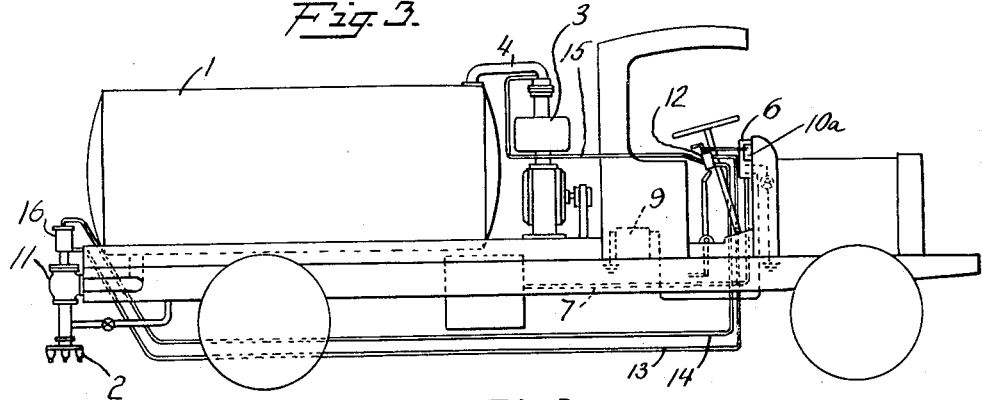
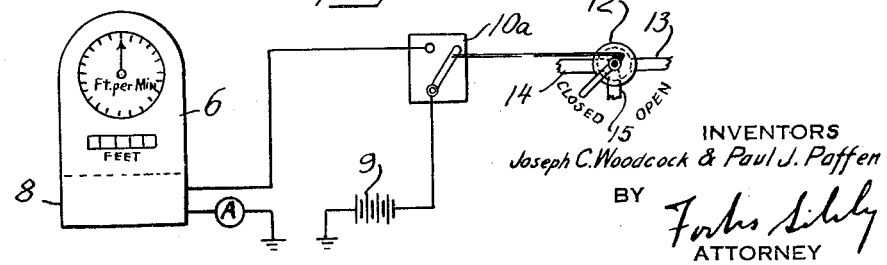
INVENTORS
Joseph C. Woodcock & Paul J. Paffen
BY
ATTORNEY

UNITED STATES PATENT OFFICE 1,924,144

INDICATOR FOR DISTRIBUTING APPARATUS

Joseph C. Woodcock, Cliffside, and Paul J. Paffen, Jersey City, N. J., assignors to The Barrett Company, New York, N. Y., a Corporation of New Jersey Application February 15, 1932. Serial No. 593,054

13 Claims. (Cl. 299—34)

This invention relates in general to the distribution of materials, such as for example road binders and the like, and is especially concerned with a device for assisting in obtaining a uniform distribution of material.

In the construction and maintenance of roads employing a bituminous liquid binder such as tar, a tank truck is commonly employed, the truck being equipped with a spray bar or other distributing device. The operator of the truck regulates the speed of the truck and flow of the binder in such a manner as to obtain as uniform a distribution as possible.

In the past there have been many difficulties encountered in obtaining a reasonable degree of uniformity of distribution by this method. A great deal of experience was required of the operator and even among skilled workmen it was a common occurrence to find a very noticeable difference in the performance of two different operators under substantially the same conditions.

The attempt has been made to obviate these difficulties by placing governors on the trucks, the operators being required to run the trucks against the governors during the application of material. This method, however, proved satisfactory only where the road was comparatively smooth and level. Where the road bed was rough, as in those instances in which it was surfaced with loose stone, or where the grade was uneven, as in hilly country, the variation in truck speed caused irregularity of the coating layer and resulted in untimely deterioration of portions of the roads so prepared.

In applying road materials in the above manner, it is necessary that the distributing apparatus be driven at a very low rate of speed, and in order that the distribution may be properly controlled, the speed should be accurately indicated at least as low as two miles per hour. The commercial speedometers in use are not sufficiently accurate at low speeds for this work and consequently specially designed indicators are required. It will be readily understood that a great strain would be placed upon such an indicator if it were allowed to operate under the normal speeds of truck operation.

According to the present invention an indicating device apart from the usual speedometer is mounted on the distributing apparatus so as to be readily visible to the operator. This indicator is adapted to register the distance and rate of travel of the apparatus, and is so constructed that it operates only when the distributing mechanism is in operation. The operator is thus enabled to determine accurately at any time the distance covered and, by reference to the quantity of material used, the rate of application. Since the speedometer is engaged only during the operation of the distributing device, it is not subject to any of the strain of high speeds which would be apt to injure it.

In the accompanying drawing we have shown a specific embodiment of our invention as applied to a type of tar distributing truck which is now in common use. It is to be understood, however, that our invention is capable of various applications and we intend in no way to be limited to the specific embodiment described.

In the drawing:

Fig. 1 represents the type of truck usually employed for the application of liquid road materials, but equipped with an indicating device arranged in accordance with our invention.

Fig. 2 is a schematic diagram showing the manner of connecting the device in the embodiment of the invention illustrated in Fig. 1.

Fig. 3 illustrates an alternative manner of applying our invention to the type of truck commonly employed for the application of liquid road materials.

Fig. 4 is a schematic diagram showing the operation of the embodiment illustrated in Fig. 3.

The truck in common usage for tar distribution, as shown in Fig. 1, includes a tank 1 for supplying tar to the distributing nozzles 2. Due to the viscosity of the tar, it is generally desirable to distribute the tar under air pressure in order to secure satisfactory delivery to the spray or distributing nozzles. For this purpose an air compressor 3 is provided and maintains the pressure on the tar distributing system through pressure line 4 during operation. This compressor is usually driven by the truck motor through an operating clutch (not shown) which connects the drive shaft with the compressor. This clutch is controlled by the truck driver by means of an operating lever 5 commonly known as the "power take-off lever".

According to our invention, indicator 6 is mounted on the dash or otherwise suitably disposed so as to be readily visible to the operator. This indicator comprises a speedometer and odometer, the former preferably being adapted to register in feet per minute and the latter in feet. The indicator may be driven in well-known manner through any drive means commonly employed for driving speedometers and odometers. In the diagram the indicator is shown as being driven by cable 7 from a take-off on the transmission.

Interposed between the driving means and the indicator, there is provided a clutch mechanism 8 which, as hereinafter explained, is adapted to disengage the indicator from the driving means. For this purpose a magnetic clutch (of known construction) has been found to be eminently satisfactory. The magnetic clutch, the operation of which is shown conventionally in Fig. 2, may be actuated by the ordinary truck battery 9. The clutch wiring circuit is preferably so arranged that when current is supplied, the clutch will be engaged and the indicator will be operatively connected, but when the supply of current is discontinued, the clutch will be disengaged and will remain so until the circuit is again completed. In order to operate the clutch, an electric switch 10 is provided. It is purposed that this switch shall be so operated that when tar is being sprayed from the truck, it will be closed, but when the spraying is discontinued, it will be opened. In order to accomplish this result, the switch may be connected to the "power take-off" lever 5, as shown diagrammatically in Fig. 2. By this method of connecting the switch the magnetic clutch will be engaged when the air compressor 3 is connected, and disengaged when the compressor is disconnected. An ammeter "A" may be provided, if desired.

In Figs. 3 and 4 a different arrangement of the indicator is shown. In the usual tar distributing truck the tar spray from the main nozzle is controlled by the valve 11. This valve is controlled by an air valve 12 which admits air to either line 13 or 14 from an air line 15 from the compressor. When the air valve 12 is in the position indicated in Fig. 4 as the "open" position, air is admitted thru line 13 to one end of an air cylinder 16 and acts against an actuating plunger (not shown) to open valve 11. When the air valve 12 is in the position indicated as the "closed" position, air passes from line 15 thru air line 14 to the other end of the air cylinder 16 and acts against the plunger to close valve 11.

In the modification shown in Figs. 3 and 4, the electric switch 10—a is mounted in such a manner that instead of being operated by the "power take-off" lever 5, it is operated by the air valve 12. As shown diagrammatically in Fig. 4, the connection of the switch 10—a is such that when the air valve 12 is operated to open the valve 11, the switch will be closed, and when the air valve is operated to close the valve 11, the switch will be opened. When this arrangement is employed the indicator 6 is adapted to operate only when the valve 11 is open; in other words, only when tar is being delivered from the main nozzle.

In operating a distributing apparatus of the type described, it is desirable that the supply system should be brought to operating pressure before the distribution of material is begun as otherwise it would be difficult to obtain a uniform application of material. When the distributing apparatus is equipped with an indicator in accordance with the embodiment of our invention illustrated in Figs. 1 and 2, the initial pressure may be acquired while the motor is idling, that is, while the apparatus is stationary, so that the indicator will not record during this operation.

Instead of employing a magnetic clutch, other means for engaging and disengaging the indicating device might be used; for example, a mechanically or hydraulically operated clutch or a clutch controlled by the pressure in one of the air lines, such as the line operating the valve 11 could also be used to advantage. We prefer, however, to employ the electrical operating means which we have shown and described because this has proven to be eminently suited for the purpose. It is inexpensive to construct, it may be easily installed, and it is especially reliable in its operation. The preferred arrangement also has the advantage that a greater latitude is possible in conveniently locating the indicator and operating mechanism than is possible when other means for controlling the indicator are employed.

It will be seen that by the practice of our invention the distribution of materials, especially liquids such as employed for road construction and maintenance, is materially assisted. The operator is enabled to determine his speed accurately, and consequently to obtain an especially uniform distribution of material. He is able at any time to determine the exact distance over which such material has been sprayed or otherwise distributed, and can thus accurately apply the material according to specifications. Wear and possible damage resulting from continuous use of the indicator at high speeds is avoided by the automatic disconnection of the device at times other than during the employment of the apparatus for spraying purposes. Since the operation of the indicator is automatic, the person operating the distributing apparatus is relieved of the necessity of paying special attention to it or manually connecting and disconnecting it during the application of road materials, etc.

Furthermore, in the practice of our invention a separate indicating device especially adapted for the low truck speed required in the distribution of road materials may be used. This advantage may be more readily appreciated from the fact that in applying road materials the distributing truck is usually driven in second or low gear at speeds of two to four miles per hour. The maximum speed which can be used satisfactorily is only about seven miles per hour. Under these conditions of operation the speedometers with which distributing trucks had been equipped prior to our invention, were of little avail for determining truck speeds during application of materials. In the practice of our invention, however, we employ an indicator which is especially adapted to these conditions and which accurately indicates to the driver his rate of travel.

We claim:

1. In a distributing apparatus means for distributing material, means for controlling the distribution of material and a device for indicating the distance traveled by said apparatus, said device being controlled by said last named means so as to indicate only that distance traveled during distribution of material.

2. In a distributing apparatus means for supplying material to be distributed, means for starting and stopping the distribution of material therefrom, a device for indicating the distance traveled by said apparatus, means for engaging and disengaging said device, said engaging and disengaging means being actuated by said starting and stopping means in such a manner that the indicating device is engaged only during the distribution of material.

3. In a distributing apparatus means for supplying material to be distributed, means for starting and stopping distribution of material therefrom, a device for indicating the distance traveled by said apparatus, driving means for said device, said driving means including a clutch, means for engaging and disengaging said clutch, said engaging and disengaging means being actuated by said starting and stopping means in such a manner that the clutch is engaged only during the distribution of material.

4. In a distributing apparatus, means for supplying material to be distributed, means for starting and stopping distribution of material therefrom, an indicator, a magnetic clutch, and an electric circuit adapted to operate said magnetic clutch, said circuit being closed and opened by said starting and stopping means in such a manner that the indicator is operatively engaged only during the distribution of material.

5. In a distributing apparatus means for supplying material to be distributed, a compressor adapted to force material from said supply means, an indicator, driving means for said indicator, said driving means including a clutch, means for starting and stopping said compressor, said clutch being actuated by said starting and stopping means in such a manner that it is engaged only when said compressor is in operation.

6. In a mobile liquid distributing apparatus, liquid supply means, a compressor arranged to force liquid from said supply means, means for starting and stopping said compressor, a device for indicating the distance and rate of travel of said apparatus, driving means for said device, said driving means including a magnetic clutch arranged to rest normally disengaged, an electric circuit arranged when energized to effect the engagement of said clutch, said starting and stopping means being adapted to control said circuit in such a manner that the circuit is energized only when said compressor is in operation.

7. In a mobile liquid distributing apparatus, liquid supply means, a valve arranged to control the flow of liquid from said supply means, means for opening and closing said valve, a device for indicating the distance and rate of travel of said apparatus, driving means for said device, said driving means including a magnetic clutch arranged to rest normally disengaged, an electric circuit arranged when energized to effect the engagement of said clutch, said opening and closing means being adapted to control said circuit in such a manner that the circuit is energized only when said valve is open.

8. A mobile apparatus for applying road material uniformly upon the surface of roads comprising a vehicle adapted to carry a supply of said road material, means for distributing said road material from said supply onto the road, a visual indicator located on said vehicle so as to be visible to the operator of said vehicle and adapted to indicate movement of said vehicle, and means controlled by the operation of said distributing means for rendering said indicator operative only while said distributing means is operative.

9. A mobile apparatus for applying road material uniformly upon the surface of roads comprising a vehicle adapted to carry a supply of said road material, means for distributing said road material from said supply onto the road, a visual indicator located on said vehicle so as to be visible to the operator of said vehicle and adapted to indicate movement of said vehicle at speeds of movement of said vehicle not exceeding seven miles per hour, and means controlled by the operation of said distributing means for rendering said indicator operative only while said distributing means is operative.

10. In a distributing apparatus means for supplying material to be distributed, means for starting and stopping the distribution of material therefrom, a device for indicating distance and rate of travel of said apparatus, means for engaging and disengaging said device, said engaging and disengaging means being actuated by said starting and stopping means in such a manner that the indicating device is engaged only during distribution of material.

11. In a distributing apparatus means for supplying material to be distributed, means for starting and stopping the distribution of material therefrom, a device for indicating the rate of travel of said apparatus, means for engaging and disengaging said device, said engaging and disengaging means being actuated by said starting and stopping means in such a manner that the indicating device is engaged only during distribution of material.

12. In a mobile liquid distributing apparatus a liquid supply means, a valve arranged to control the flow of liquid from said supply means, means for opening and closing said valve, a device for indicating the distance traveled by said apparatus, means for engaging and disengaging said device, said engaging and disengaging means being actuated by said opening and closing means in such a manner that the indicating device is engaged only during the distribution of material.

13. In a mobile liquid distributing apparatus a liquid supply means, a compressor adapted to force liquid from said supply means, means for starting and stopping said compressor, a device for indicating the distance traveled by said apparatus, means for engaging and disengaging said device, said engaging and disengaging means being actuated by said starting and stopping means in such a manner that the indicating device is engaged only during distribution of material.

JOSEPH C. WOODCOCK.
PAUL J. PAFFEN.